United States Patent
Chik et al.

[19]

[11] Patent Number: 6,061,255
[45] Date of Patent: May 9, 2000

[54] DRIVE CIRCUIT FOR SYNCHRONOUS RECTIFIERS IN ISOLATED FORWARD CONVERTER

[75] Inventors: Wong Siu Chik, Estate Kin; Wong Man Chuen, Wanchai, both of The Hong Kong Special Administrative Region of the People's Republic of China

[73] Assignee: Astec International Limited, The Hong Kong Special Administrative Region of the People's Republic of China

[21] Appl. No.: 09/326,493

[22] Filed: Jun. 4, 1999

[51] Int. Cl.$^7$ .................................................. H02M 3/335
[52] U.S. Cl. ................................................................ 363/21
[58] Field of Search .................................. 363/15, 16, 20, 363/21, 95, 97, 131

[56] References Cited

U.S. PATENT DOCUMENTS

| | | |
|---|---|---|
| 4,788,634 | 11/1988 | Schlecht et al. . |
| 4,857,822 | 8/1989 | Tabisz et al. . |
| 5,077,486 | 12/1991 | Marson et al. . |
| 5,179,512 | 1/1993 | Fisher et al. ............................. 363/127 |
| 5,303,138 | 4/1994 | Rozman . |
| 5,304,875 | 4/1994 | Smith . |
| 5,343,383 | 8/1994 | Shinada et al. . |
| 5,410,467 | 4/1995 | Smith et al. . |
| 5,453,923 | 9/1995 | Scalais et al. . |
| 5,477,131 | 12/1995 | Gegner . |
| 5,528,482 | 6/1996 | Rozman . |
| 5,552,695 | 9/1996 | Schwartz . |
| 5,570,276 | 10/1996 | Cuk et al. . |
| 5,590,032 | 12/1996 | Bowman et al. . |
| 5,708,571 | 1/1998 | Shinada . |
| 5,726,869 | 3/1998 | Yamashita et al. . |
| 5,781,421 | 7/1998 | Steigerwald et al. . |
| 5,784,266 | 7/1998 | Chen . |
| 5,801,572 | 9/1998 | Nakamura . |
| 5,818,704 | 10/1998 | Martinez . |
| 5,870,299 | 2/1999 | Rozman .................................. 363/127 |
| 5,872,705 | 2/1999 | Loftus, Jr. ................................ 363/21 |
| 5,999,420 | 12/1999 | Aonuma et al. ......................... 363/21 |

*Primary Examiner*—Matthew Nguyen
*Attorney, Agent, or Firm*—Coudert Brothers

[57] ABSTRACT

A forward converter circuit that includes synchronous rectifiers as the forward and freewheeling rectifying elements in the output stage. The forward converter also includes a drive circuit for the synchronous rectifiers. The drive circuit includes an auxiliary secondary winding on the power transformer which is used to generate the gate control signal for the forward synchronous rectifier and an auxiliary winding on the output inductor which is used to generate the gate control signal for the freewheeling synchronous rectifier. An auxiliary switch is used to turn off the freewheeling rectifier, with the switch operating in response to the gate drive signal for the power switch.

20 Claims, 6 Drawing Sheets

DRIVE CIRCUIT FOR SYNCHRONOUS RECTIFIERS IN ISOLATED FORWARD CONVERTER

BACKGROUND OF THE INVENTION

1. Field of the Invention

The present invention relates to switched power supplies, and more specifically, to a forward converter that incorporates synchronous rectifiers in the output stage to reduce the voltage drop and power loss associated with the use of Schottky diodes or other conventional rectifying elements. The inventive forward converter includes a drive signal generating circuit for the synchronous rectifiers which provides properly timed square wave gate drives to control the operation of the rectifiers, thereby reducing turn on and turn off losses of the rectifiers and increasing the efficiency of the converter circuit.

2. Description of the Prior Art

Switching or "switch mode" power supplies use a semiconductor device as a power switch to control the application of a voltage to a load. A forward converter is used to provide a regulated output (or load) voltage ($V_{OUT}$) which is lower than the input voltage ($V_{IN}$) supplied by the input power supply. FIG. 1 is a schematic diagram showing a circuit for a conventional prior art forward converter 100. Applying a waveform to gate node 103 controls the operation of power switch Q1 102 (which is shown as a MOSFET device but may be of other types). The waveform applied to gate node 103 is typically provided by a control circuit (not shown) which supplies a pulsed control signal using pulse width modulation (PWM), for example. When switch 102 is turned "on", i.e., conducting, the input voltage, $V_{IN}$, provided across input supply nodes 300 and 302, is applied across the primary winding of power transformer 104. A secondary voltage, $V_S$, is developed across the secondary winding of transformer 104 and applied across forward output rectifier $D_{O1}$ 106 (which then becomes forward biased). Current and power flows to output inductor $L_O$ 108 and output capacitor $C_O$ 110 (which form a LC filter), and load $R_L$. Assuming a sufficiently large enough value for output capacitor $C_O$ 110, and neglecting diode drops and losses, the voltage across inductor 108 will be equal to $V_S$ minus the output voltage, $V_{OUT}$ (where $V_S$ is equal to the turns ratio of the power transformer times the input voltage, $V_{IN}$, and the output voltage is seen across output nodes $V_{OUT1}$ and $V_{OUT2}$). The current ($i_L$) in inductor 108 will increase linearly with time and will be described by:

$$di_L/dt = (V_S - V_{OUT})/L_O.$$

When power switch Q1 is turned off, i.e., non-conducting, the secondary voltage $V_S$ will reverse. However, the current in inductor 108 will continue to flow in the forward direction rendering "freewheeling" output diode $D_{O2}$ 112 conductive (forward biased). This permits the current to continue circulating in the circuit loop formed from diode 112, inductor 108, capacitor 110, and load $R_L$ (which is applied across the output nodes). The voltage across inductor 108 eventually reverses, having a value equal to the output voltage $V_{OUT}$ (again neglecting diode drops). The current in inductor 108 now decreases with time, and may be described by:

$$di_L/dt = (-V_{OUT})/L_O.$$

In a steady-state condition, the volt-seconds applied to inductor 108 are equal in the forward and reverse directions. Thus, when the "on" period for switch 102 ($t_{on}$) during a cycle is equal to the "off" period ($t_{off}$) during a cycle, the output voltage $V_{OUT}$ will be equal to one-half the value of the secondary side voltage $V_S$. When the ratio of the power switch's "on" time to "off" time differs from a 50% duty factor (where the duty factor is defined as $t_{on}/(t_{on}+t_{off})$), the output voltage is given by:

$$V_{OUT} = V_S * t_{on}/(t_{on}+t_{off}).$$

A drawback of switch mode power circuits as described above is that in certain circumstances the output stage rectifiers (i.e., diodes 106 and 112 in FIG. 1) can be a significant source of power loss. This is particulary true in switching power supplies which are intended to produce relatively low output voltages, e.g., in the range of 2 to 3 volts. Even Schottky diodes, which are used in some conventional low output voltage supplies, have a significant voltage drop across the devices and hence can result in a relatively large power loss in such applications.

It has been suggested to use synchronous rectifiers to replace the Schottky diodes or other rectifying elements in the output stage of a forward converter. Such synchronous rectifiers are conventionally implemented in the form of a low-voltage MOSFET (with a low on-state resistance) or low-voltage bipolar junction transistor (with a low on-state voltage). However, a problem arises because the operation of the synchronous rectifiers must be synchronized with each other and with the switching components of the forward converter in order to optimize the operation of the circuit and reduce power losses. This is not readily achieved with forward converters which produce non-square wave outputs from the power transformer because such outputs cause a delay in the turn on and turn off of the rectifiers and can alter the initial timing set up between the control signals for the rectifiers. In such situations there is an increase in power loss due to the increased conduction time of the rectifying device. In addition, such circuits typically require an auxiliary control circuit which increases the cost, size, and complexity of the converter.

What is desired is a forward converter circuit which incorporates synchronous rectifiers in the output stage and which includes a control circuit to generate the control signals and properly synchronize the operation of the rectifiers with the other components of the converter.

SUMMARY OF THE INVENTION

The present invention is directed to a forward converter circuit that includes synchronous rectifiers as the forward and freewheeling rectifying elements in the output stage. The forward converter also includes a drive circuit for the synchronous rectifiers. The drive circuit includes an auxiliary secondary winding on the power transformer which is used to generate the gate control signal for the forward synchronous rectifier and an auxiliary winding magnetically coupled to the output inductor which is used to generate the gate control signal for the freewheeling synchronous rectifier. An auxiliary switch is used to turn off the freewheeling rectifier, with the switch operating in response to the gate drive signal for the power switch.

In one embodiment, the inventive forward converter includes a series combination of a primary winding of a power transformer and a power switch connected across a first and a second input supply node, with a secondary winding of the power transformer connected across a first secondary side node and a second secondary side node. An output inductor having magnetically coupled first and second windings is connected such that said first winding is in series between the first secondary side node and a first output node. A first synchronous rectifier has a control node operable to permit current flow between the second secondary side node and a second output node. A second secondary winding of the power transformer is connected between the second output node and the control node of the first synchronous rectifier. A second synchronous rectifier is operable to permit current flow between the first secondary side node and the second output node. The second winding of said output inductor is connected between the second output node and a control node of the second synchronous rectifier. The inventive circuit also includes a control circuit to turn off the second synchronous rectifier in response to a control signal for the power switch.

DETAILED DESCRIPTION OF THE INVENTION

The present invention is directed to a circuit for a forward converter which incorporates synchronous rectifiers as the forward and freewheeling diodes in the output stage. The synchronous rectifiers reduce the voltage drop and hence power loss associated with using diodes as rectifying elements, thereby increasing the efficiency of the converter circuit. The inventive circuit includes auxiliary windings on the secondary side of the power transformer and on the output inductor which are used to generate the gate control drive signals for the synchronous rectifiers. The auxiliary windings produce appropriately timed square wave signals which minimize the conduction period of the body diodes associated with the rectifiers and hence minimize the power loss of those devices. The inventive circuit operates independently of any forward converter reset mechanism and can be used with any forward converter topology.

Figure 1:
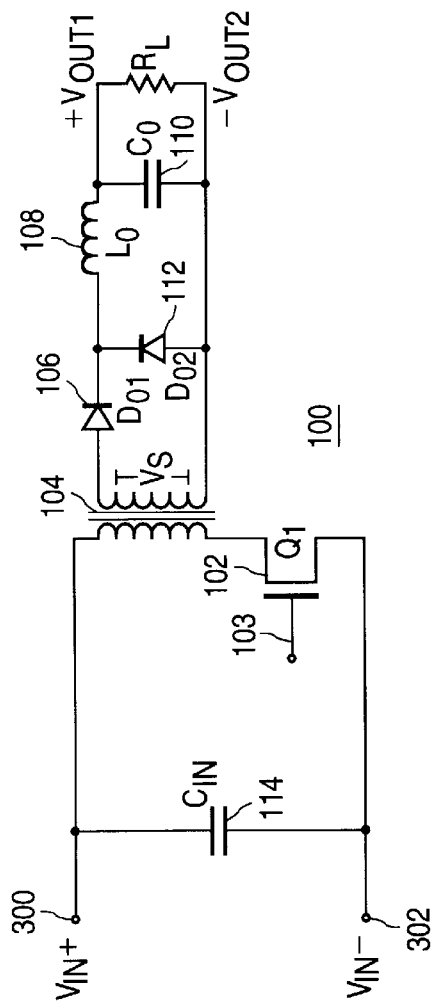
FIG. 1 is a schematic diagram showing a circuit for a conventional prior art forward converter.
Figure 2:
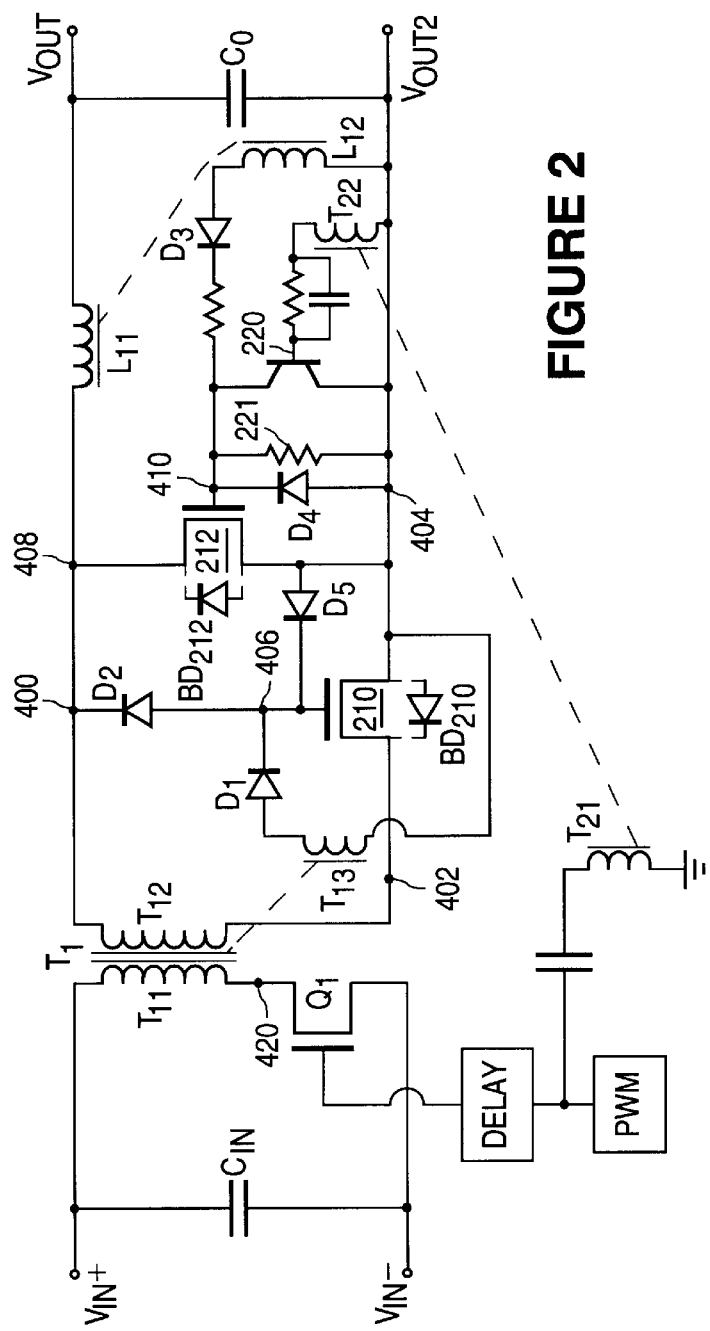
FIG. 2 is a schematic diagram of an embodiment of the forward converter of the present invention.
Figure 3A:
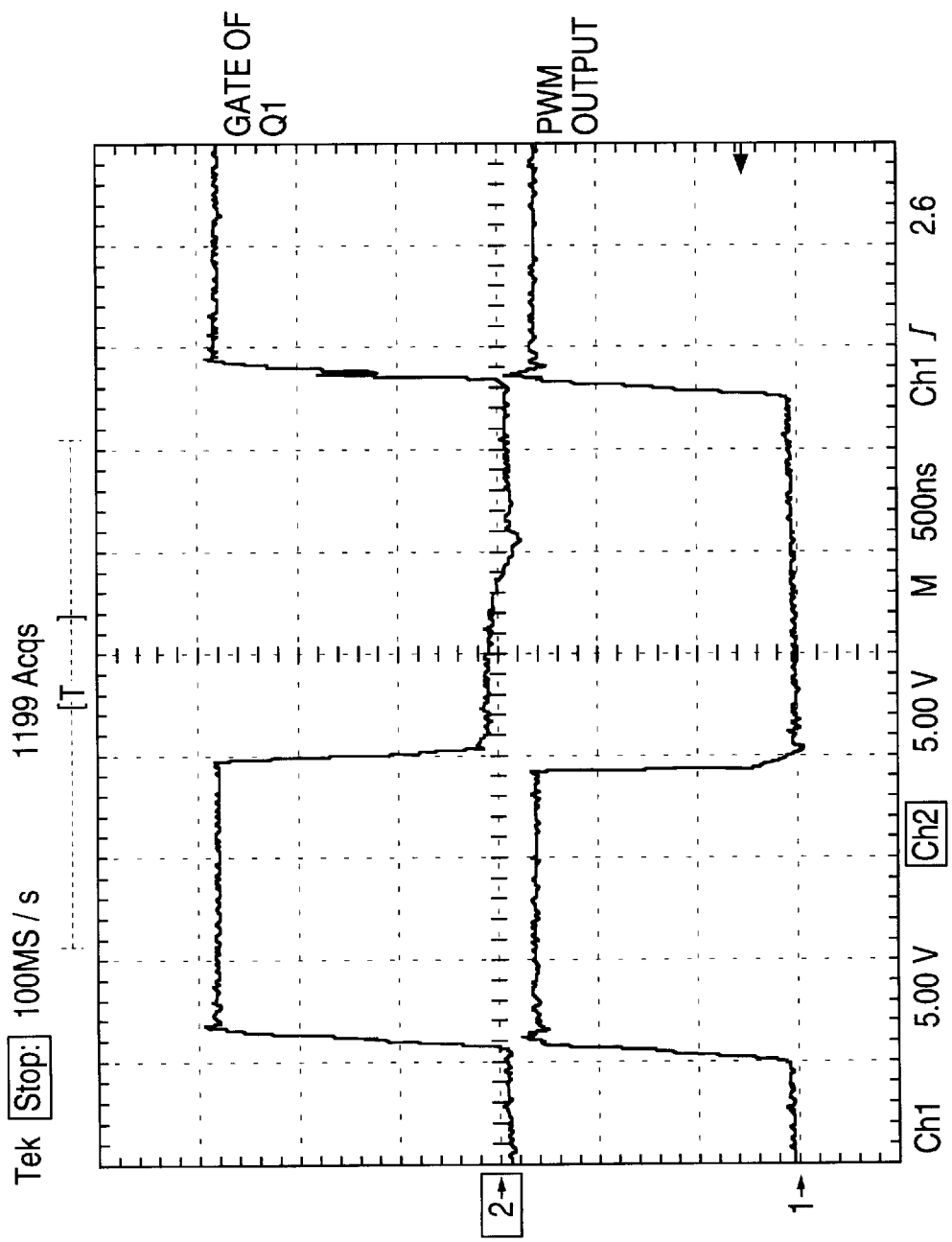
FIGS. 3(a) to 3(e) are a set of voltage waveforms that illustrate the operation of the forward converter of FIG. 2.
Figure 3B:
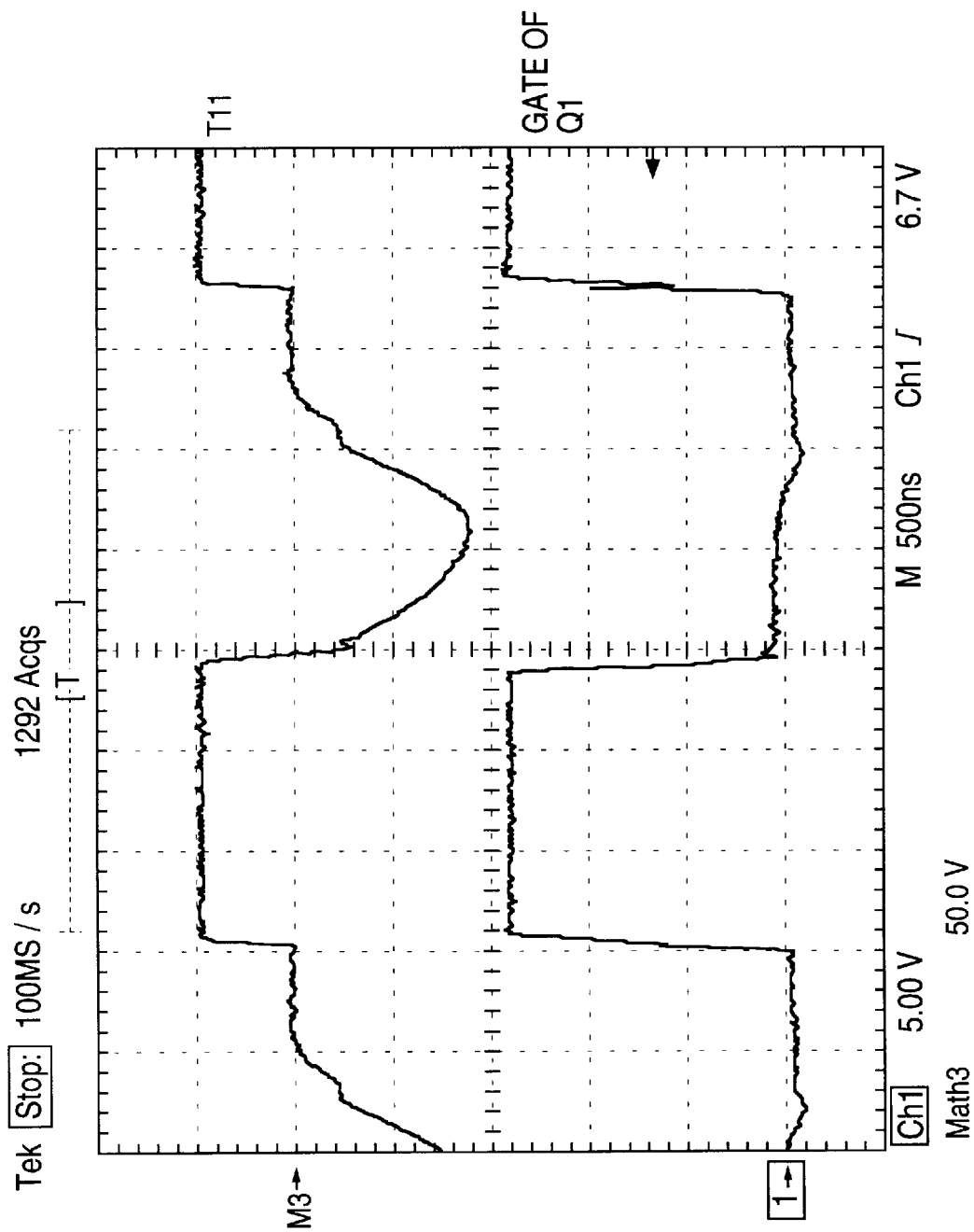
Figure 3C:
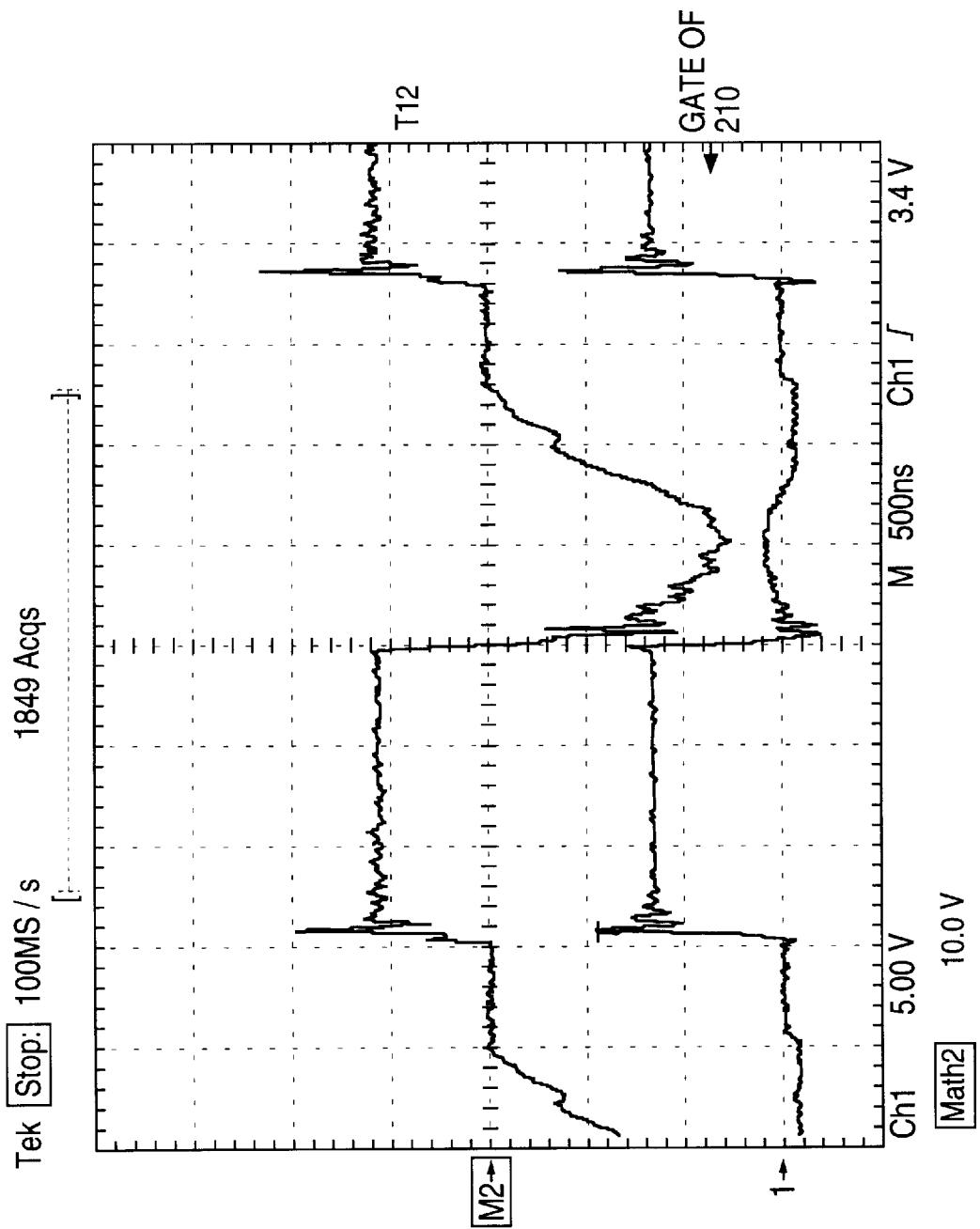
Figure 3D:
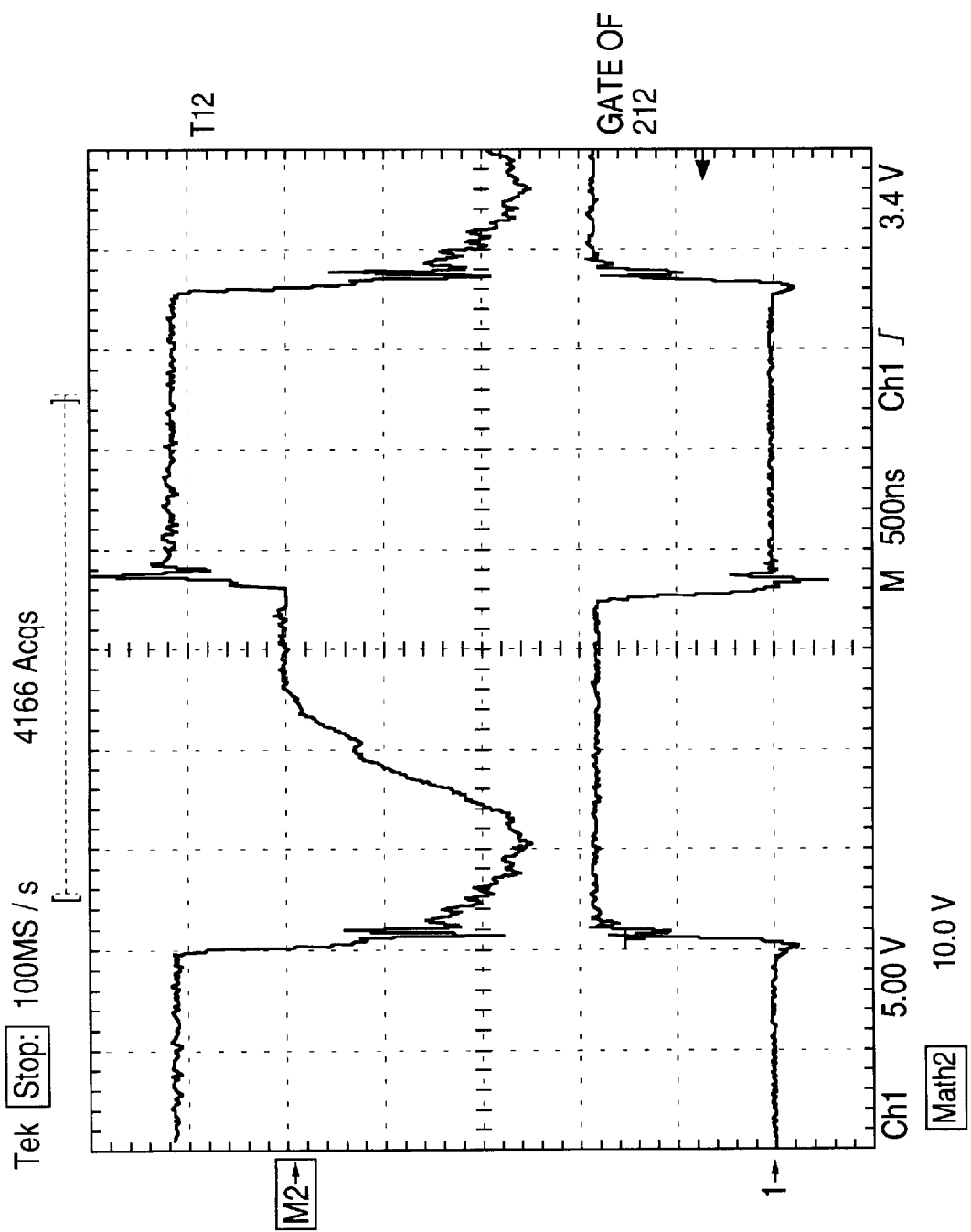
Figure 3E:
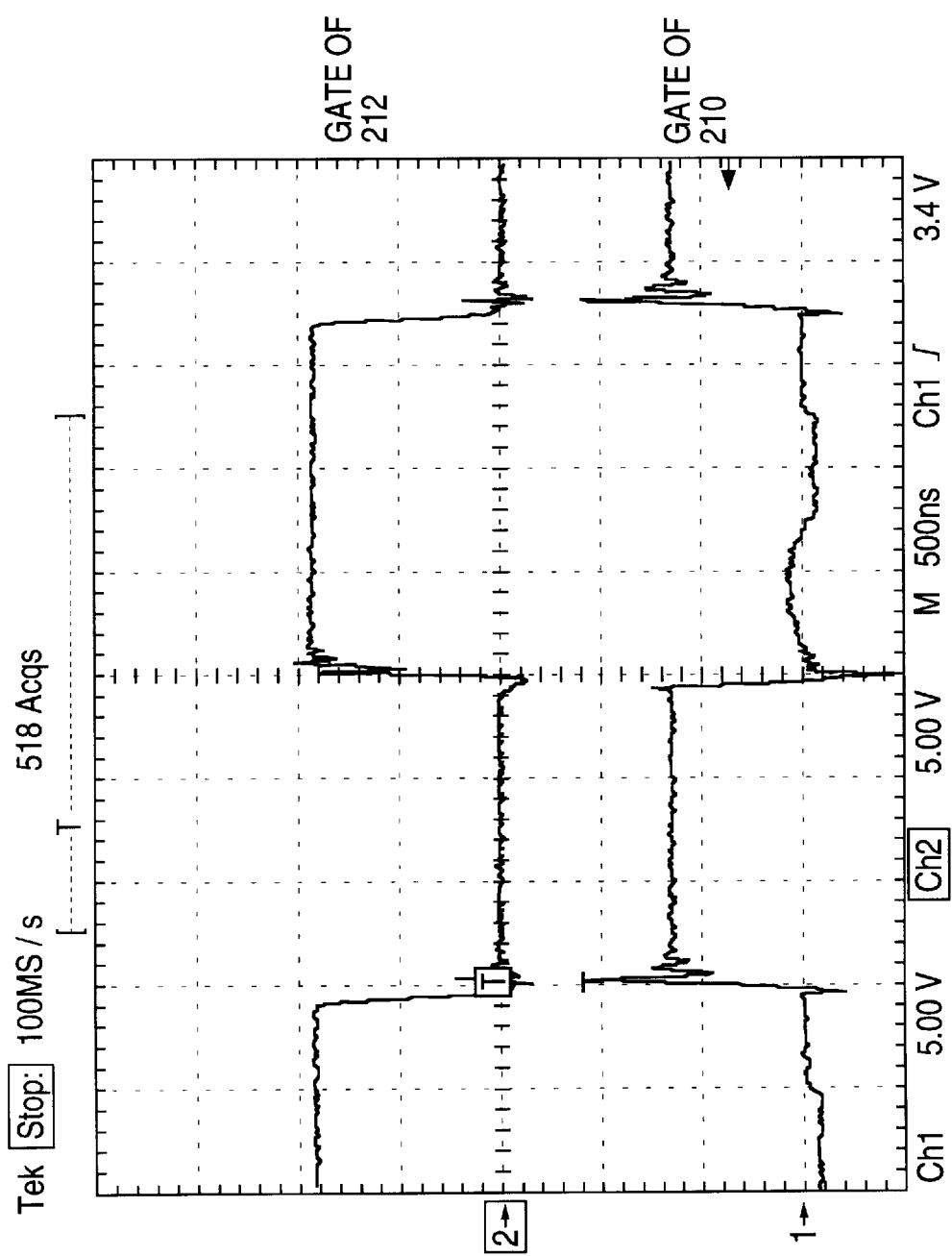

FIG. 2 is a schematic diagram of an embodiment of the forward converter of the present invention. FIGS. 3(a) to 3(e) are a set of voltage waveforms that illustrate the operation of the forward converter of FIG. 2. FIG. 3(a) shows the output signal from the PWM signal generator (labeled "PWM OUTPUT") and the gate drive signal for power switch Q1 (labeled "GATE OF Q1"). FIG. 3(b) shows the voltage through the primary winding $T_{11}$ of transformer $T_1$ (labeled "T11") and the gate drive signal for power switch Q1. FIG. 3(c) shows the voltage through the secondary winding $T_{12}$ of transformer $T_1$ (labeled "T12") and the gate drive signal applied to synchronous rectifier 210 (labeled "GATE OF 210"). FIG. 3(d) shows the voltage through the secondary winding $T_{12}$ of transformer $T_1$ and the gate drive signal applied to synchronous rectifier 212 (labeled "GATE OF 212"). FIG. 3(e) shows the gate drive signal applied to synchronous rectifier 210 and the gate drive signal applied to synchronous rectifier 212.

As shown in FIG. 2, along with the additional components to be described, the inventive converter includes the basic components of a conventional forward converter. A power switch Q1 is connected in series with the primary winding $T_{11}$ of power transformer $T_1$ at a primary side node (labeled element 420 in the figure), with this combination connected across the input supply voltage terminals or nodes (labeled $V_{IN}+$ and $V_{IN}-$ the figure). On the secondary side of power transformer $T_1$ (i.e., winding $T_{12}$) is output inductor $L_1$, having winding $L_{11}$ connected in series between one of the secondary side nodes of transformer secondary winding $T_{12}$ (labeled element 400 in the figure, with the secondary connected across first and second secondary side nodes 400 and 402) and a first output node (labeled $V_{OUT1}$ in the figure). Output capacitor $C_O$ is connected across the first output node and a second output node (labeled $V_{OUT2}$ in the figure). Input capacitor $C_{IN}$ is connected across input nodes $V_{IN}+$ and $V_{IN}-$.

In accordance with the present invention, the forward converter includes forward synchronous rectifying element 210 (shown as a MOSFET device, but which may also take the form of other suitable devices such as an insulated gate bipolar transistor, IGBT) and freewheeling synchronous rectifying element 212 (also shown as a MOSFET device, but which may take the form of other suitable devices). Synchronous rectifiers 210 and 212 are operable to permit current to be conducted between a first and second node of each device, typically by applying a control signal to a gate or control node of the devices. For example, forward synchronous rectifying element 210 is operable to permit current to be conducted between nodes 402 and 404 in the figure, by application of a control signal to node 406. Freewheeling synchronous rectifying element 212 is operable to permit current to be conducted between nodes 404 and 408 in the figure, by application of a control signal to node 410.

The inventive circuit also includes elements to control the operation of the synchronous rectifiers by generating gate drive signals for the rectifiers which have the appropriate timing relationship relative to the gate drive signal for power switch Q1 and to each other. These elements include an extra secondary winding on power transformer $T_1$ (labeled $T_{13}$ in the figure), an auxiliary winding on output inductor $L_1$ (labeled $L_{12}$ in the figure) which is magnetically coupled to winding $L_{11}$, and a second transformer $T_2$ having a primary winding $T_{21}$ and a secondary winding $T_{22}$. The control elements also include switch element 220 which is used in controlling the operation of rectifier 212.

In operating the inventive forward converter, a pulse-width-modulated signal generated by an appropriate circuit (labeled as "PWM" in the figure) is used to control the operation of power switch Q1 by generating pulses which are applied to the gate (control) node of the switch. The pulses output by PWM are delayed by an amount determined by a delay element (labeled "DELAY" in the figure). When the output of PWM goes positive, secondary winding $T_{22}$ of transformer $T_2$ goes positive, turning on switch 220. This operates to turn off synchronous rectifier 212 by applying a control signal to the gate or control node of that device.

After a delay period introduced by the delay element (of about 80 nanoseconds, for example), power switch Q1 turns on. This causes the input supply voltage present across input supply nodes $V_{IN}+$ and $V_{IN}-$ to be applied across primary winding $T_{11}$ of power transformer $T_1$. A current is produced in secondary winding $T_{13}$ through the coupling of that winding with primary winding $T_{11}$. At the same time, winding $T_{13}$ goes positive, providing a control signal to the gate or control node 406 of rectifier 210, turning on synchronous rectifier 210 through diode $D_1$. Secondary winding $T_{12}$ transfers energy to the output nodes ($V_{OUT1}$ and $V_{OUT2}$) through the conductive path provided by turned on synchronous rectifier 210 and winding $L_{11}$ of output inductor $L_1$.

When the output of the PWM goes low, the voltage across secondary winding $T_{22}$ of transformer $T_2$ goes negative, turning off switch 220. After the delay period, power switch Q1 is turned off. Secondary winding $T_{13}$ goes negative, causing diode $D_1$ to become reverse-biased. Output inductor $L_1$ now enters a flyback mode. The gate charge on synchronous rectifier 210 discharges through diode $D_2$ and inductor winding $L_{11}$ to an output node, causing rectifier 210 to turn off.

A current flows in output inductor winding $L_{12}$ through the magnetic coupling of that winding with winding $L_{11}$, and winding $L_{12}$ goes positive, turning on synchronous rectifier 212, through diode $D_3$ and the resistive element shown, by applying a control signal to the gate or control node 410 of the rectifier. Diode $D_4$ prevents switch 220 from turning on due to the current pulse injected by the drain-to-gate miller capacitance of synchronous rectifier 212 when the current in secondary winding $T_{12}$ of power transformer $T_1$ drops to zero.

When the PWM signal generator turns off the PWM signal, winding $T_{13}$ will reverse polarity and a negative voltage will be coupled to the gate of synchronous rectifying element 210. Diode $D_5$ is used to clamp element 210 at a diode drop below zero and prevent the gate from being negative when it is off.

Resistor 221 is connected across the gate and source of synchronous rectifying element 212. This is because if the PWM signal is disabled, switch 220 will not turn on and element 212 will keep turning on until its gate is discharged by the leakage current of diode $D_4$ and switch 220. Resistor 221 is used to discharge the gate of element 212 and serves to define the maximum "on" time of element 212 after the PWM signal is turned off. Under a "no load" condition, capacitor $C_O$ will be discharged by element 212. The defined "on" time can be set to prevent element 212 from being damaged by the discharge current from $C_O$.

As the present inventors have realized, in order to efficiently utilize the output stage synchronous rectifiers, it is desirable that rectifier 210 be on for the entire period during which the current flowing in secondary winding $T_{12}$ is positive, and it is desirable that rectifier 212 be on for the entire period during which the current flowing in secondary winding $T_{12}$ is either zero or negative. Because of the voltage drop across the body diodes of the synchronous rectifiers (shown as elements "BD 210" and "BD 212" in the figure), it is desirable to minimize the conduction time of the diodes. This is achieved by the inventive gate drive circuit for the synchronous rectifiers which provides square wave drive signals for rectifiers 210 and 212. The use of square wave drive signals produces a crisp turn on and turn off of the synchronous rectifiers, thereby minimizing the body diode conduction time and hence power loss associated with the operation of the rectifiers.

The inventive synchronous rectifier drive circuit operates independently of any reset mechanism for the magnetic core of the power transformer. This means that the invention can be used with a forward converter circuit which utilizes a clamp element or with a converter circuit which lacks a clamp. The turn on and turn off signals for rectifier 210 are provided by the converter circuitry itself, so that an external driver circuit is not required. The turn on signal for rectifier 212 is similarly provided by the converter circuitry, with the turn off signal provided by the simple circuit composed of transformer $T_2$ and switch 220.

Note that the gate drive voltage for rectifiers 210 and 212 can be adjusted by varying the turn ratio of windings $T_{12}$ to $T_{13}$ and $L_{11}$ to $L_{12}$, respectively. Furthermore, a proportion of the gate drive energy for rectifier 210 can be returned to the output by using the circuit configuration shown.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

What is claimed is:

1. A forward converter, comprising:
   a power transformer having a primary winding connected in series between a first input supply voltage node and a primary side node, and a secondary winding connected across a first and a second secondary side node;
   a power switch connected between the primary side node and a second input supply voltage node;
   a first synchronous rectifying device having a control node and operable to conduct current between the second secondary side node and a second output node;
   a second secondary winding of the power transformer connected between the second output node and the control node of the first synchronous rectifying element;
   a second synchronous rectifying having a control node and operable to conduct current between the first secondary side node and the second output node;
   a first winding of a magnetic energy storage element connected between the first secondary side node and a first output node;
   a second winding of the magnetic energy storage element magnetically coupled to the first winding and connected between the second output node and the control node of the second synchronous rectifying element; and
   a control circuit operable to turn off the second synchronous rectifying element at a predetermined time in response to a control signal applied to the power switch.

2. The forward converter of claim 1, further comprising:
   a source of the control signal for the power switch.

3. The forward converter of claim 2, wherein said control signal is a pulse width modulated (PWM) signal.

4. The forward converter of claim 2, further comprising:
   a delay circuit positioned between the source of the control signal and a control node of the power switch for delaying the coupling of said control signal to said control node.

5. The forward converter of claim 1, wherein the control circuit for turning off the second synchronous rectifier further comprises:
   a reset switch; and
   a transformer having a primary and a second winding and operable to couple the control signal applied to the power switch to a control node of said reset switch to turn off the second synchronous rectifier.

6. The forward converter of claim 1, further comprising:
   an output capacitor connected in parallel across the first and second output nodes.

7. The forward converter of claim 1, wherein the power switch is a field effect transistor (FET) device.

8. The forward converter of claim 1, wherein the first synchronous rectifier is a field effect transistor (FET) device.

9. The forward converter of claim 1, wherein the second synchronous rectifier is a field effect transistor (FET) device.

10. A forward converter, comprising:
    a series combination of a primary winding of a power transformer and a power switch connected across a first and a second input supply node;

a secondary winding of the power transformer connected across a first secondary side node and a second secondary side node;

an output inductor having a first winding connected between the first secondary side node and a first output node;

a first synchronous rectifier having a control node and operable to permit current flow between the second secondary side node and a second output node;

a second secondary winding of the power transformer connected across the second output node and the control node of the first synchronous rectifier;

a second synchronous rectifier having a control node and operable to permit current flow between the first secondary side node and the second output node;

a second output inductor winding magnetically coupled to the first winding and connected between the second output node and the control node of the second synchronous rectifier; and a control circuit to turn off the second synchronous rectifier in response to a control signal for the power switch.

11. The forward converter of claim 10, further comprising:

a source of the control signal for the power switch.

12. The forward converter of claim 11, wherein the control signal is a pulse width modulated (PWM) signal.

13. The forward converter of claim 11, further comprising:

a delay circuit positioned between the source of the control signal and a control node of the power switch for delaying the coupling of said control signal to said control node.

14. The forward converter of claim 10, wherein the control circuit for turning of the second synchronous rectifier further comprises:

a reset switch; and a transformer having a primary and a second winding and operable to couple the control signal applied to the power switch to a control node of said reset switch to turn off the second synchronous rectifier.

15. The forward converter of claim 10, wherein the power switch is a field effect transistor (FET) device.

16. The forward converter of claim 10, wherein the first synchronous rectifier is a field effect transistor (FET) device.

17. The forward converter of claim 10, wherein the second synchronous rectifier is a field effect transistor (FET) device.

18. The forward converter of claim 10, further comprising:

an output capacitor connected in parallel across the first and second output nodes.

19. A method of operating a forward converter, comprising:

generating a first control signal for a power switch connected in a series combination with a primary winding of a power transformer, wherein the series combination is connected across a first and a second input supply node;

coupling the first control signal to a control node of a control switch to turn off a second synchronous rectifier in an output stage of the forward converter, wherein the second synchronous rectifier is operable to permit current flow between a first secondary side node and a second output node;

applying a delayed version of the first control signal to a control node of the power switch to turn the power switch on;

coupling current flowing in the primary winding of the power transformer to a control node of a first synchronous rectifier in the output stage of the forward converter, wherein the first synchronous rectifier is operable to permit current flow between an output stage inductor, a secondary winding of the power transformer, and the first output node, the output stage inductor connected between the first secondary side node and a first output node;

transferring energy stored in the power transformer to the first output node and the second output node through the first synchronous rectifier and the output stage inductor;

generating a second control signal for the power switch;

coupling the second control signal to the control node of the control switch to turn off the control switch;

applying a delayed version of the second control signal to the control node of the power switch to turn the power switch off; and coupling the current flowing through the output stage inductor to a control node of the second synchronous rectifier to turn on the second synchronous rectifier.

20. The method of claim 19, wherein the step of generating the first control signal for the power switch further comprises:

generating a pulse width modulated control signal.

* * * * *